United States Patent [19]

Nelson et al.

[11] 4,394,497

[45] Jul. 19, 1983

[54] SOLID MATERIALS PREPARED FROM EPOXY RESINS AND PHENOLIC HYDROXYL-CONTAINING MATERIALS

[75] Inventors: Donald L. Nelson; Bryan A. Naderhoff, both of Lake Jackson, Tex.

[73] Assignee: The Dow Chemical Company, Midland, Mich.

[21] Appl. No.: 362,799

[22] Filed: Mar. 29, 1982

[51] Int. Cl.³ .................. C08G 59/00; C08G 65/14
[52] U.S. Cl. ............................ 528/101; 528/87; 528/97; 528/104
[58] Field of Search ............... 528/87, 97, 101, 104

[56] References Cited

U.S. PATENT DOCUMENTS

| | | | |
|---|---|---|---|
| 2,385,787 | 10/1945 | Bruson | 260/612 |
| 3,404,102 | 10/1968 | Starcher et al. | 260/2 |
| 3,419,624 | 12/1968 | Cotter et al. | 260/619 |
| 3,461,097 | 8/1979 | Cotter et al. | 260/47 |
| 3,536,734 | 10/1970 | Vegter et al. | 260/348.6 |
| 3,582,516 | 6/1971 | LeBlanc | 260/33.6 |
| 3,637,430 | 1/1972 | Dahms et al. | 117/143 A |
| 3,931,109 | 1/1976 | Martin | 528/104 X |
| 3,944,523 | 3/1976 | Gobran | 260/62 |
| 4,340,716 | 7/1982 | Hata et al. | 528/104 X |

FOREIGN PATENT DOCUMENTS 2028314A 3/1980 United Kingdom .

*Primary Examiner*—Lucille M. Phynes
*Attorney, Agent, or Firm*—J. G. Carter

[57] ABSTRACT

Solid compositions are prepared by reacting (A) one or more materials containing an average of more than one 1,2-epoxy groups with (B) one or more materials containing an average of more than one phenolic hydroxy groups wherein at least one of (A) or (B) contains with respect to (B) or has been prepared from with respect to (A) a reaction product of (1) at least one aromatic compound having at least one aromatic ring, at least one aromatic hydroxyl group and which aromatic ring contains at least one ortho or para position which is capable of being alkylated and (2) at least one aliphatic or cycloaliphatic $C_4$–$C_6$ unsaturated hydrocarbon or a dimer, codimer, oligomer or cooligomer thereof.

9 Claims, No Drawings

SOLID MATERIALS PREPARED FROM EPOXY RESINS AND PHENOLIC HYDROXYL-CONTAINING MATERIALS

BACKGROUND OF THE INVENTION

The present invention concerns the solid reaction products of one or more 1,2-epoxy-containing materials with one or more phenolic hydroxyl-containing materials wherein at least one of such epoxy-containing materials or such phenolic hydroxyl-containing materials is, in the instance of the phenolic hydroxyl-containing material, or has been prepared from, in the case of the epoxy-containing material, the reaction product of a phenolic hydroxyl-containing material having at least one alkylatable ortho or para hydrogen and an unsaturated hydrocarbon containing from 4 to 6 carbon atoms, dimers and oligomers thereof and mixtures thereof.

Solid reaction products of epoxy-containing compounds of phenolic hydroxyl-containing compounds have found utility in such applications as castings, moldings, coatings, laminates, and the like.

The products of the present invention provide for such uses at a reduced cost without great sacrifices in physical or chemical properties and in some instances provide for an improvement in higher temperature applications as evidenced by an increase in the glass transition temperature (Tg).

SUMMARY OF THE INVENTION

The present invention concerns solid compositions resulting from reacting, in the presence of an effective quantity of suitable catalyst,
 (A) at least one material having an average of more than one 1,2-epoxy group per molecule, with
 (B) at least one material having an average of more than one phenolic hydroxyl-group per molecule;
wherein at least one of (A) or (B) contains, with respect to (B), or has been prepared from, with respect to (A), a reaction product of
 (1) at least one aromatic compound having at least one aromatic ring, at least one aromatic hydroxyl group and which aromatic ring contains at least one ortho or para position capable of being alkylated, and
 (2) at least one aliphatic or cycloaliphatic unsaturated hydrocarbon containing from 4 to 6 carbon atoms, dimers and oligomers thereof and mixtures thereof.

DETAILED DESCRIPTION OF THE INVENTION

Suitable epoxy resins which can be employed herein include those glycidyl ethers of aliphatic and aromatic compounds having an average of more than one glycidyl ether group per molecule. Suitable such epoxy resins include the glycidyl ethers of neopentyl glycol, dibromoneopentyl glycol, polyoxypropylene glycol, resorcinol, catechol, hydroquinone, bisphenol A, phenol-formaldehyde condensation products, tetrabromobisphenol A, mixtures thereof and the like.

Suitable phenolic hydroxyl-containing materials which can be employed herein include, for example, resorcinol, catechol, hydroquinone, bisphenol A, tetrabromobisphenol A, phenol-formaldehyde condensation products, phenolic terminated reaction products of epoxy resins having an average of more than one glycidyl ether group per molecule and a phenolic hydroxyl-containing compound having an average of more than one phenolic OH group per molecule, mixtures thereof and the like.

Suitable such epoxy resins and phenolic hydroxyl-containing materials are more fully described in HANDBOOK OF EPOXY RESINS, by Lee and Neville, McGraw-Hill, 1967, U.S. Pat. No. 3,948,855 issued to Perry, U.S. Pat. No. 3,477,990 issued to Dante et al. and U.S. Pat. No. 3,931,109 issued to Martin, all of which are incorporated herein by reference.

Suitable aromatic hydroxyl-containing compounds which contain at least one aromatic ring, at least one phenolic hydroxyl group and at least one ortho or para ring position available for alkylation which can be employed herein include, for example, phenol, chlorophenol, bromophenol, methylphenol, hydroquinone, catechol, resorcinol, guaiacol, pyrogallol, phloroglucinol, isopropyl phenol, ethyl phenol, t-butyl phenol, octyl phenol, nonyl phenol, cumyl phenol, p-phenyl phenol, m-phenyl phenol, bisphenol A, dihydroxy diphenyl sulfide, dihydroxy diphenyl sulfone, mixtures thereof and the like.

Suitable unsaturated hydrocarbons which, either in a crude or purified state, can be employed herein include, for example, butadiene, isoprene, piperylene, cyclopentadiene, cyclopentene, 2-methyl butene-2, cyclohexene, cyclohexadiene, methyl cyclopentadiene, dicyclopentadiene, limononone, dipentene, linear and cyclic dimers of piperylene, methyl dicyclopentadiene, dimethyl dicyclopentadiene, norbornene, norbornadiene, ethylidine norbornene, mixtures thereof and the like. Also suitable unsaturated hydrocarbons include the other dimers, codimers, oligomers and cooligomers of the aforementioned unsaturated hydrocarbons. Particularly suitable unsaturated hydrocarbons which can be employed herein include, for example, a dicyclopentadiene concentrate containing from about 70 to about 94 percent by weight of dicyclopentadiene; from about 6 to about 30 percent by weight of $C_9$–$C_{12}$ dimers or codimers of $C_4$–$C_6$ dienes such as, for example, cyclopentadiene-isoprene, cyclopentadiene-piperylene, cyclopentadiene-methyl cyclopentadiene, and/or dimers of isoprene, piperylene, methyl cyclopentadiene and the like; from about zero to about 7 percent by weight of $C_{14}$–$C_{18}$ trimers of $C_4$–$C_6$ dienes and from about zero to about 10 percent by weight of aliphatic diolefins such as, for example, piperylene, isoprene, 1,5-hexadiene and cyclic olefins such as cyclopentadiene, methyl cyclopentadiene, cyclopentene and the like. Methods of preparation for these dicyclopentadiene concentrates and more detailed descriptions thereof can be found collectively in U.S. Pat. No. 3,557,239 issued to Gebhart et al. and U.S. Pat. No. 4,167,542 issued to Nelson, both of which are incorporated herein by reference.

Also, particularly suitable unsaturated hydrocarbons which can be employed herein include a crude dicyclopentadiene stream containing from about 20 to about 70 percent by weight dicyclopentadiene, from about 1 to about 10 percent codimers and dimers of $C_4$–$C_6$ hydrocarbons (described above), from about zero to about 10 percent oligomers of $C_4$–$C_6$ dienes and the balance to provide 100 percent, $C_4$–$C_6$ alkanes, alkenes and dienes.

Also, particularly suitable unsaturated hydrocarbons which can be employed herein include a crude piperylene or isoprene stream containing from about 30 to about 70 percent by weight piperylene or isoprene, about zero to about ten percent by weight $C_9$–$C_{12}$ dimers and codimers of C$_4$–C$_6$ dienes, and the balance to provide 100% C$_4$–C$_6$ alkanes, alkenes and dienes.

Also, particularly suitable are hydrocarbon oligomers prepared by polymerization of the reactive components in the above hydrocarbon streams e.g., dicyclopentadiene concentrate, crude dicyclopentadiene, crude piperylene or isoprene, individually or in combination with one another on in combination with high purity diene streams.

Suitable acid catalysts which can be employed herein as a catalyst for reacting the phenolic hydroxyl-containing compound with the unsaturated hydrocarbons include, for example, Lewis Acids, alkyl, aryl and aralkyl sulfonic acids and sulfonic acids of diphenyloxide and alkylated diphenyloxide, mixtures thereof and the like.

Particularly suitable are such Lewis Acids as organic complexes of boron trifluoride such as those complexes formed with phenol, cresol, ethanol or acetic acid. Also suitable Lewis acids include aluminum chloride, zinc chloride, stannic chloride, and the like.

Also suitable as catalysts include, for example, activated clays, silica, silica-alumina complexes, and the like.

Suitable catalysts which can be employed in the reaction of 1,2-epoxy-containing materials and phenolic hydroxyl-containing materials include, for example, alkali metal hydroxides, phosphonium and ammonium compounds such as those mentioned in the above referenced handbook and patents.

Suitable epoxy alkyl halides which can be employed herein include those represented by the formula

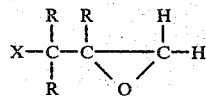

wherein each R is independently hydrogen or an alkyl group having from 1 to about 6 carbon atoms and X is a halogen.

Particularly suitable epoxy alkyl halides include, for example, epichlorohydrin, epibromohydrin, epiiodohydrin, methylepichlorohydrin, methylepibromohydrin, methylepiiodohydrin, mixtures thereof and the like.

The solid epoxy resins of the present invention can be prepared, if desired, in the presence of a suitable inert reaction medium.

The lower molecular weight solid products of the present invention and which contain an average of more than one glycidyl ether group per molecule can be cured with the conventional epoxy resin curing agents. Particularly suitable curing agents include, for example, primary, secondary and tertiary amines, polycarboxylic acids and anhydrides thereof, polyhydroxy aromatic compounds, combinations thereof and the like.

The high molecular weight products of the present invention can also be employed with the conventional curing agents, but can also be employed without curing in solvent coatings.

The products of the present invention can be employed in the preparation of coatings, castings, moldings, laminates and the like.

The following examples are illustrative of the present invention but are not to be construed as to limiting the scope thereof in any manner. All parts are by weight unless otherwise indicated.

EXAMPLE 1

(A) Preparation of DCPD/phenolic

To a reactor equipped with a stirrer, condenser, thermowell and heater add 1882 gms (20 moles) of phenol and 8 gms (0.4% based on total weight) of boron trifluoride etherate. Heat to 70° C. and add 132 gms (~1 mole) of a C$_{10}$ diene stream containing mainly dicyclopentadiene and cyclopentadiene-isoprene codimers over a 20 minute (1200 s) period. Increase the temperature to 150° C. over a 3 hour (10,800 s) time period and hold for about 3 hours (10,800 s). Distill off unreacted phenol with a finishing temperature of 210° C. and less than 5 mm Hg. The recovered product is a dicyclopentadiene bisphenol with an average functionality of 2.07.

(B) Preparation of Solid Epoxy Resin

Into a 5-necked 1-liter glass reaction vessel equipped with a stirrer, condenser and temperature controller were charged 100 parts (0.53 epoxy equivalent) of a diglycidyl ether of bisphenol A having an average epoxide equivalent weight (EEW) of 187.8 and 61.5 parts (0.375 OH equivalent) of the phenolic compound prepared in A above. The contents were heated to 90° C. and 0.15 parts of ethyltriphenyl phosphonium acetate.acetic acid complex catalyst solution (70 weight percent catalyst in methanol) was added. The contents were then heated to 125° C. and maintained thereat for 1.5 hours (5400 s). The resultant epoxy resin had the following properties.

| EEW | 1000 |
|---|---|
| viscosity | 9700 cps @ 150° C. |
| softening point | 117.2° C. |

EXAMPLE 2

A. Preparation of DCPD/Phenolic

The DCPD phenolic was that described in Example 1-A.

B. Preparation of Epoxy Resin from DCPD/Phenolic

To a reactor equipped with a stirrer, condenser, nitrogen sparge, thermowell and addition funnel were added 805 gms (5 OH equivalents) of the DCPD phenolic described in Example 1-A, 900 gms of the methyl ether of propylene glycol, 20 gms of water, 2 gms of 50% NaOH and 2312.5 gms (25 moles) of epihalohydrin. The solution was heated to 70° C. 909.1 gms (5 moles) of 22% NaOH was added over a 2 hour and 37 minute (9420 s) time period. The reaction was held at 70° C. for an additional 52 minutes (3120 s). The resin was transferred to a separating funnel where the brine and resin layers were allowed to separate. The brine layer was discarded, the resin solution returned to the reaction flask, and 139 gms of the methyl ether of propylene glycol added. The mass was heated to 69° C. and 200 gms (1.25 moles) of 25% NaOH was added over a 21 minute (1260 s) period and then allowed to react an additional 75 minutes (4500 s). The resin was transferred to a separating funnel, the brine layer drawn off, washed with water and the water layer removed. The resin was returned to the reactor where the methyl ether of propylene glycol and excess epichlorohydrin were removed by vacuum distillation. The resin was finished at 155° C. and 3 mm Hg. The resin was a semisolid at room temperature with an epoxy equivalent weight of 237.

C. Preparation of Solid Epoxy Resin

Into a glass reaction vessel equipped as in Example 1-B were charged 125 parts (0.53 epoxy equivalent) of the epoxy resin prepared in Example 2-B and 40.4 parts (0.36 OH equivalent) of bisphenol A. After heating to 85° C. and adding 0.125 part of ethyltriphenyl phosphonium acetate.acetic acid catalyst solution (70 wt. % in methanol) the contents were heated to and maintained at a temperature of 175° C. for 45 minutes (2700 s). The resultant solid epoxy resin had the following properties.

| EEW | 899 |
| --- | --- |
| viscosity | 9000 cps @ 150° C. |
| softening point | 119.2° C. |

EXAMPLE 3

Into a glass reaction vessel described in Example 1-B were added 100 parts (0.42 epoxy equivalent) of the epoxy resin prepared in Example 2-B and 46.7 parts (0.36 phenolic OH equivalent) of the product prepared in Example 1-A. After heating to 90° C., 0.15 part of ethyltriphenyl phosphonium acetate.acetic acid complex catalyst solution (70 wt. % in methanol) was added. The temperature was then increased to 170° C. and maintained thereat for 2 hours (7200 s). The resultant epoxy resin had the following properties.

| EEW | 844 |
| --- | --- |
| viscosity | 4700 cps @ 150° C. |
| softening point | 122.2° C. |

EXAMPLE 4

A. Preparation of DCPD/Phenolic

To a reactor equipped as in Example 1-A were added 2823 gms (30 moles) of phenol and 16.1 gms of BF$_3$ etherate in 20 gms of carbon tetrachloride. The mass was heated to 55° C. and 1201.2 gms (9.09 moles) of a 99.9% reactive C$_{10}$ hydrocarbon stream consisting mainly of dicyclopentadiene and cyclopentadiene isoprene codimers was added over a 4 hour (14400 s) period. The temperature of the reaction mass was 80° C. after the hydrocarbon addition period. The reactor was heated to 150° C. over a 7 hour (25200 s) period and a vacuum distillation begun. The reaction was finished at 245° C. and 1 mm Hg. The resin had an equivalent weight of 187, a melt point of 115° C. and an average functionality of 2.95.

B. Preparation of Epoxy Resin

To a reactor equipped an in Example 2-B were added 841.5 gms (4.5 equivalents) of the resin described in 4-A, 840 gms of the methyl ether of propylene glycol, 9.2 gms of 50% NaOH, 15 gms of water and 2081.2 (22.5 moles) of epichlorohydrin. The solution was heated to 70° C. 900 gms (4.5 moles) of 20% NaOH was added over a 98 minute (5880 s) period. The reaction was held at 70° C. for an additional hour (3600 s). The resin and brine were separated as in Example 2-B. The resin solution was returned to the flask and heated to 75° C. 225 gms (1.125 moles) of 20% sodium hydroxide was added over a 19 minute (1140 s) period. The resin was allowed to continue to digest for 66 minutes (3960 s). The resin was finished in the manner described in Example 2-B. The final conditions were 165° C. and 1 mm Hg. The resin had a melt point of 78° C. and an EEW of 256.

C. Preparation of Solid Epoxy Resin

To a glass reaction vessel equipped as in Example 1-B were added 154.4 parts (0.60 epoxy equivalent) of the epoxy resin prepared in 4-B and 25 parts (0.22 OH equivalent) of bisphenol A. After heating to 85° C., 0.16 part of ethyltriphenyl phosphonium acetate.acetic acid catalyst solution (70 wt. % in methanol) was added. The temperature was then increased to 175° C. and maintained thereat for 45 minutes (2700 s). The resultant product had the following properties.

| EEW | 490 |
| --- | --- |
| viscosity | 4200 cps @ 175° C. |

EXAMPLE 5

A. Preparation of DCPD/Phenolic

Same as that prepared in Example 4-A.

B. Preparation of Solid Resin

To a glass reaction vessel equipped as in Example 1-B were added 313.4 parts (1.676 OH equivalents) of the 2.95 functional DCPD/phenolic prepared in A above and 50 parts (0.28 epoxy equivalents) of a diglycidyl ether of bisphenol A having an epoxide equivalent weight of 179. After heating to 105° C., 0.42 part of ethyltriphenyl phosphonium acetate.acetic acid complex catalyst (70 wt. % in methanol) was added. After the exotherm (~192° C.) had subsided, the temperature was maintained at 175° C. until the percent epoxide was <0.5%. The product had the following properties.

| epoxy content | 0% |
| --- | --- |
| viscosity | 2100 cps @ 175° C. |
| softening point | 130.7° C. |
| phenolic OH | 6.31% |

EXAMPLE 6

A. Preparation of DCPD/Phenolic

To a reactor equipped with a stirrer, thermowell and heater, were added 3387.6 gms (36 moles) of molten phenol and 17.9 gms of BF$_3$ etherate in 10 gms of carbon tetrachloride. The reactor was heated to 70° C. and 1081.1 gms (8.18 moles) of DCPD concentrate was added over a 3 hour and 14 minute (11,640 s) period. (DCPD concentrate contains about 80%–85% dicyclopentadiene, 13%–19% codimers of cyclopentadiene with other C$_4$ and C$_6$ dienes and 1.0%–5% lights (C$_4$–C$_6$ mono-olefins and di-olefins). The temperature during this addition period was maintained between 70° C. and 85° C. After the hydrocarbon addition was complete, the mass was heated to 145° C. over a 4 hour (14,400 s) time period. An additional reaction time of about 3 hours (10,800 s) was given at that temperature and vacuum stripping of unracted phenol commenced. The reaction was finished at 223° C. and 2 mm of mercury. Total distillate was 2160 gms providing a product yield of 2326.6 gms. The resultant product had an average phenolic hydroxyl functionality of 2.75 and a melting point of 105° C.

B. Preparation of Epoxy Resin from DCPD/Phenolic

To a reactor equipped with a stirrer, condenser, nitrogen sparge, thermowell and addition funnel were added 836.6 gms (4.7 eq.) of the phenolic resin prepared in Example 6-A above, 840 gms of the methyl ether of propylene glycol, 10.9 gms of 50% NaOH, 16 gms of water and 2173.8 ms (23.5 moles) of epichlorohydrin. The solution was heated to 73° C. 987 gms (4.94 moles) of 20% NaOH was added over a 53 minute (3180 s) period. The reaction was held at 75° C. for an additional 87 m (5220 s). The resin was transferred to a separating funnel where the brine and resin layers were allowed to separate. The brine layer was discarded and the resin solution was returned to the reaction vessel and heated to 73° C. 235 gms (1.175 moles) of 20% NaOH was added over a 25 minute (1500 s) period and then allowed to digest for an additional 70 minutes (4200 s). The resin was transferred to a separating funnel, the brine layer drawn off, the resin was washed with water and the water layer removed. The resin solution was returned to the reactor where the epichlorohydrin and the methyl ether of propylene glycol were removed by vacuum distillation. The resin was finished at 140° C. and about 2 mm of Hg. The resin had a melting point of 66° C. and an average epoxy equivalent weight of 247.

C. Preparation of Solid Epoxy Resin

To a reactor equipped with a mechanical stirrer, thermowell, temperature recorder-controller and condenser were added 494 gms (2 eq) of dicyclopentadiene novolac epoxide prepared in Example 6-B above, 271.8 gms (0.5 moles) of tetrabromobisphenol A and 50 gms of the methyl ether of propylene glycol. The contents were heated to 115° C. 0.35 gm (500 ppm) of 70% solids in methanol of ethyltriphenyl phosphonium acetate was added and the temperature set at 125° C. The reaction was allowed to exotherm to 150° C. over the next 20 minutes (1200 s). 100 gms of the methyl ether of propylene glycol were added to reduce foaming. Some methyl ether of propylene glycol was removed by vacuum stripping at 160° C. to 165° C. The finished resin had a solids content of 93.7% and an epoxide content of 5%. Theoretical is 5.3%. The polymer eq. wt. was 865.

EXAMPLE 7

A. Preparation of DCPD Oligomer

To a Parr reactor equipped with a stirrer, heater, temperature and pressure indicators was charged 1600 grams of DCPD concentrate as employed in Example 6-A. The reactor was pressurized to 200 psig (1379 kPa), heated to 200° C. and maintained thereat for about 2 hours (7200 s). The resultant product was a waxy solid at room temperature and is believed to be a mixture consisting primarily of $C_5$ trimers, tetramers, pentamers and hexamers and having an average molecular weight of about 264.

B. Preparation of DCPD/Phenolic

To a reactor equipped as in Example 6-A above were added 4140 gms (44 moles) of phenol and 18.6 gms of $BF_3$ etherate. The mass was heated to 58° C. at which point 528 gms (2 moles) of oligomer, prepared as in Example 7-A above, and 400 gms of toluene were added. The temperature at the end of the hydrocarbon addition period (1 hour, 17 minutes or 4620 s) was 80° C. The reaction was slowly heated to 155° C. over 7 hours and 30 minutes (27,000 s) at which point the excess phenol was removed. The resin was finished at 225° C. at less than 1 mm Hg. The resultant product had an average phenolic hydroxyl equivalent weight of 211 and a melting point of 119° C.

C. Preparation of Epoxy Resin from DCPD/Phenolic

To a reactor equipped with a stirrer, condenser, nitrogen sparge, thermowell and addition funnel were added 378.9 gms (1.8 eq.) of the phenolic resin prepared in Example 7-B above, 380 gms of the methyl ether of propylene glycol, 8 gms of water and 832 gms (9 moles) of epichlorohydrin. The solution was heated to 72° C. 327.3 gms (1.8 moles) of 22% NaOH was added over a 1 hour and 14 minute (4440 s) period. The reaction was held at 70° C. for an additional 60 minutes (3600 s). The resin was transferred to a separating funnel where the brine and resin layers were allowed to separate. The brine layer was discarded and the resin solution returned to the reactor and heated to 75° C. 172 gms (0.45 moles) of 25% NaOH was added over a 47 minute (2820 s) period and then allowed to digest for an additional hour (3600 s). The resin was transferred to a separating funnel, the brine layer drawn off, washed with water and the water layer removed. The resin solution was returned to the reactor where the epichlorohydrin and the methyl ether of propylene glycol were removed by vacuum distillation. The resin was finished at 180° C. and about 5 mm of Hg. The resin had a melting point of 76° C. and an average epoxy equivalent weight of 310.

D. Preparation of Solid Epoxy Resin

Into a reactor equipped as in Example 1-B was added 65.4 parts of the epoxy resin prepared in Example 7-C above and 14 parts of bisphenol A. After raising the temperature to 90° C., 0.07 part of ethyltriphenyl phosphonium acetate.acetic acid complex catalyst solution (70% in methanol) was added. The temperature was then increased to 175° C. and maintained thereat for one hour (3600 s). The resultant solid epoxy resin had the following properties.

| EEW | 768 |
|---|---|
| viscosity | 6800 cps @ 175° C. |
| softening point | 137.7° C. |

EXAMPLE 8

Into a reaction vessel equipped as in Example 1 was charged 75 parts of a diglycidyl ether of bisphenol A having an average EEW of 179 and 57.4 parts of a DCPD/phenolic prepared as in Example 7-B above. After raising the temperature to 90° C., 0.08 parts of ethyltriphenyl phosphonium acetate.acetic acid complex catalyst solution (70% in methanol) was added. The temperature was then increased to 175° C. and maintained thereat for 1 hour and 15 minutes (4500 s). The resultant solid epoxy resin had the following properties.

| EEW | 778 |
|---|---|
| viscosity | 7200 cps @ 175° C. |
| softening point | 127° C. |

We claim:

1. Solid compositions resulting from reacting, in the presence of an effective quantity of a suitable catalyst,
   (I) at least one material having an average of more than one 1,2-epoxy group per molecule with
   (II) at least one material having an average of more than one phenolic hydroxyl group per molecule;
   wherein at least one of (I) or (II) contains with respect to (II) or has been prepared from with respect to (I) a reaction product of
   (A) at least one aromatic compound containing (1) at least one aromatic ring, (2) at least one aromatic hydroxyl group and (3) which aromatic ring has at least one ortho or para position capable of being alkylated, and
   (B) at least one unsaturated aliphatic or cycloaliphahtic hydrocarbon containing 4 to 6 carbon atoms or one or more dimers or oligomers thereof, or mixtures thereof.

2. A composition of claim 1 wherein component (I) contains an epoxy resin composition resulting from the dehydrohalogenation of the reaction product of
   (A) an epoxy alkyl halide; with
   (B) an acid catalyzed product resulting from reacting
      (1) at least one aromatic hydroxyl-containing compound having at least one aromatic ring and at least one ortho or para position with respect to a hydroxyl group available for ring alkylation; with
      (2) at least one unsaturated hydrocarbon selected from
         (a) unsaturated hydrocarbons having from 4 to 6 carbon atoms; or
         (b) dimers, codimers, oligomers or cooligimers of unsaturated hydrocarbons, which hydrocarbons have 4 to 6 carbon atoms; and
   wherein the components (B-1) and (B-2) are employed in quantities which provide a mole ratio of (B-1) to (B-2) of from about 1.8:1 to about 30:1, and components (A) and (B) are employed in quantities which provide an epoxy group to phenolic hydroxyl group ratio of from about 1.5:1 to about 20:1.

3. A composition of claim 2 wherein the mole ratio of component (B-1) to component (B-2) is from about 1.8:1 to about 20:1 and the epoxy group to phenolic hydroxyl group ratio provided by components (A) and (B) is from about 3:1 to about 5:1.

4. A composition of claim 3 wherein component (A) is epichlorohydrin.

5. A composition of claims 1, 2, 3 or 4 wherein component (II) contains a material which is an acid catalyzed product resulting from reacting
   (A) at least one aromatic compound containing at least one aromatic hydroxyl-group and at least one aromatic ring and at least one ortho or para position relative to a hydroxyl group available for ring alkylation; with
   (B) at least one unsaturated hydrocarbon selected from
      (1) unsaturated hydrocarbons having from 4 to 6 carbon atoms; or
      (2) dimers, codimers, oligomers or cooligomers of unsaturated hydrocarbons, which hydrocarbons have from 4 to 6 carbon atoms; and
   wherein components (A) and (B) are employed in quantities which provide a mole ratio of component (A) to component (B) of from about 1.8:1 to about 30:1 and wherein said catalyst is employed in quantities of from about 0.01% to about 5% by weight of the quantity of component (A).

6. A composition of claim 5 wherein components (A) and (B) are employed in quantities which provides a mole ratio of (A) to (B) of from about 1.8:1 to about 20:1 and said catalyst employed in a quantity from about 0.3% to about 1% by weight of component (A).

7. A composition of claims 2, 3 or 4 wherein component (B-1) is phenol and component (B-2) is a composition comprising
   (1) from about 70% to about 94% by weight of dicyclopentadiene;
   (2) from about 6 to about 30 percent by weight of $C_{10}$ dimers;
   (3) from about zero to about 7 percent by weight of oligomers of $C_4$–$C_6$ unsaturated hydrocarbon; and
   (4) the balance, if any, to provide 100% by weight of $C_4$–$C_6$ alkanes, alkenes and dienes.

8. A composition of claim 5 wherein component (A) is phenol and component (B) is a composition comprising
   (1) from about 70% to about 94% by weight of dicyclopentadiene;
   (2) from about 6 to about 30 percent by weight of $C_{10}$ dimers;
   (3) from about zero to about 7 percent by weight of oligomers of $C_4$–$C_6$ unsaturated hydrocarbon; and
   (4) the balance, if any, to provide 100% by weight of $C_4$–$C_6$ alkanes, alkenes and dienes.

9. A composition of claim 6 wherein component (A) is phenol and component (B) is a composition comprising
   (1) from about 70% to about 94% by weight of dicyclopentadiene;
   (2) from about 6 to about 30 percent by weight of $C_{10}$ dimers;
   (3) from about zero to about 7 percent by weight of oligomers of $C_4$–$C_6$ unsaturated hydrocarbon; and
   (4) the balance, if any, to provide 100% by weight of $C_4$–$C_6$ alkanes, alkenes and dienes.

* * * * *